(12) United States Patent
Dorenbosch

(10) Patent No.: US 6,952,592 B2
(45) Date of Patent: Oct. 4, 2005

(54) METHOD AND APPARATUS FOR LIMITING A TRANSMISSION IN A DISPATCH SYSTEM

(75) Inventor: Jheroen P. Dorenbosch, Paradise, TX (US)

(73) Assignee: Motorola, Inc., Schaumburg, IL (US)

( * ) Notice: Subject to any disclaimer, the term of this patent is extended or adjusted under 35 U.S.C. 154(b) by 142 days.

(21) Appl. No.: 10/271,271

(22) Filed: Oct. 15, 2002

(65) Prior Publication Data

US 2004/0072586 A1 Apr. 15, 2004

(51) Int. Cl.$^7$ .............................. H04B 7/00; H04Q 7/20
(52) U.S. Cl. ........................ 455/518; 455/416; 455/520; 455/512
(58) Field of Search ................................ 455/415, 416, 455/417, 449, 420, 452.1, 447, 527, 517, 518, 519, 520, 510, 412.2, 507, 521, 509, 511, 512, 419

(56) References Cited

U.S. PATENT DOCUMENTS

| | | | |
|---|---|---|---|
| 5,740,537 A | * | 4/1998 | Beming et al. ............. 455/450 |
| 5,815,799 A | | 9/1998 | Barnes et al. |
| 5,953,671 A | * | 9/1999 | Childress ..................... 455/512 |
| 5,960,362 A | * | 9/1999 | Grob et al. .................. 455/527 |
| 6,169,906 B1 | | 1/2001 | Bruckert |
| 6,301,263 B1 | | 10/2001 | Maggenti |
| 6,674,459 B2 | * | 1/2004 | Ben-Shachar et al. ... 348/14.09 |

* cited by examiner

Primary Examiner—Nick Corsaro
Assistant Examiner—John J. Lee
(74) Attorney, Agent, or Firm—Kevin D. Wills

(57) ABSTRACT

A controller 103 for a dispatch communications system 100 that is arranged and constructed for limiting a transmission in the dispatch communications system, methods thereof, and communications units 115, 117, 123 for use within the system have been discussed. The controller comprises: a processor 405, cooperatively operating with a transceiver 403, to; grant and provide a first right to talk to a first user 203; monitor a dispatch call resulting from the grant of the first right to talk to the first user to evaluate whether the first user should retain the first right to talk 207, 209; and notify, when the evaluation so determines, a second user 211 that the first right to talk is no longer applicable.

25 Claims, 4 Drawing Sheets

METHOD AND APPARATUS FOR LIMITING A TRANSMISSION IN A DISPATCH SYSTEM

FIELD OF THE INVENTION

This invention relates in general to communication systems and more specifically to methods and apparatus for limiting a transmission in a dispatch system.

BACKGROUND OF THE INVENTION

Dispatch communications systems are known. They are used for dispatch calls that are often half duplex. For such dispatch calls one user does the transmitting or talking and all other users that are on or within the dispatch call or group that is participating in the dispatch call are receiving or listening. Generally the user that is talking must relinquish the channel in order for another user to access the channel and talk to the other users. This presents a problem when the talker or user doing the talker is reluctant or unable (equipment malfunction) to relinquish the channel so that another user can talk. It is known to use a timer and upon the lapse of the timer allow other users to request and gain access to the channel and thus address the group on the dispatch call. However presently the non-talking users do not know when the timer has lapsed. Furthermore there are many situations where a single timer with a single value does not provide satisfactory performance for varying users of the system. Clearly a need exists for more flexible way of limiting transmissions in a dispatch communications system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENTS

Figure 1:
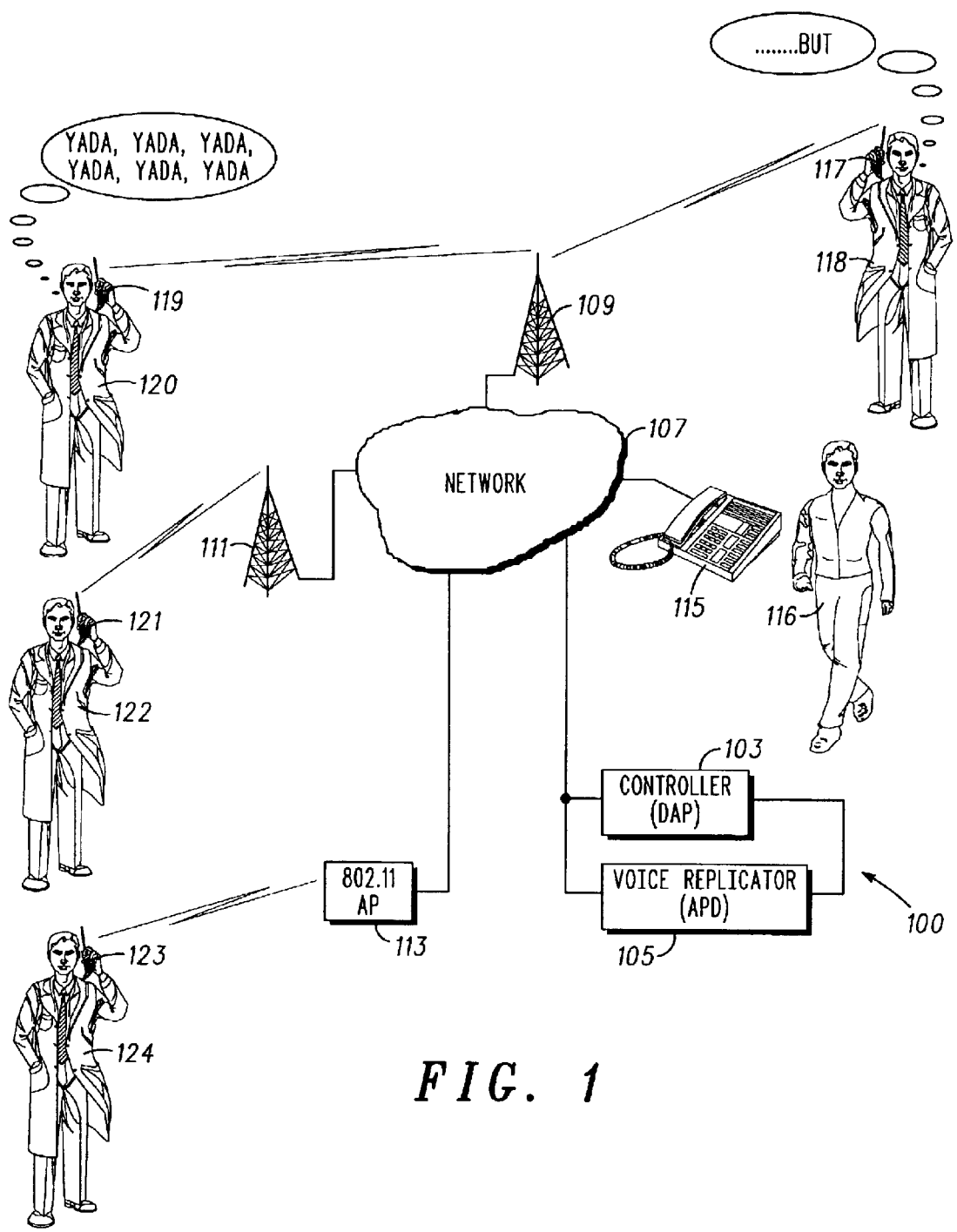
FIG. 1 depicts, in a simplified and representative form, a dispatch communications system suitable for supporting a dispatch call.

In overview form the present disclosure concerns systems, methods, and equipment or apparatus that provide communications services to users of such systems and equipment and specifically techniques for assuring reasonable access to such services in a dispatch environment. More particularly various inventive concepts and principles embodied in system controllers or user devices and methods therein for limiting a transmission in a dispatch communications system and dispatch call in a reasonable fashion taking into consideration various relevant factors regarding the dispatch call and users thereon all for the convenience and advantage of users or consumers of such dispatch services are discussed and described. The dispatch systems, equipment, and the like and rely on some form of connectivity, thus network, that may be any combination of wired and wireless networks. Networks of particular interest may be organized on a wide area network (WAN) or local area network (LAN) basis generally in a structured manner and should be suitable for modest bandwidth communications. It is expected that a preferred form of access to this network by user equipment and associated users thereof is via a wireless protocol or extensions thereof such as may be found in systems such as Integrated Digital Enhanced Networks (IDEN) or more conventional dispatch networks such as those providing services to various public safety organizations.

As further discussed below various inventive principles and combinations thereof are advantageously employed to limit transmissions resulting from the lack of consideration by a user or equipment failure, thus alleviating various problems associated with known systems that ignore the problem or rely on a fixed inflexible approach, thereby advantageously facilitating a fair and reasonable approach to controlling duration of transmission from users, provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs and instructions. It is expected that one of ordinary skill, notwithstanding possibly significant effort and many design choices motivated by, for example, available time, current technology, and economic considerations, when guided by the concepts and principles disclosed herein will be readily capable of generating such software instructions with minimal experimentation. Therefore, in the interest of brevity and minimization of any risk of obscuring the principles and concepts according to the present invention, further discussion of such software, if any, will be limited to the essentials with respect to the principles and concepts used by the preferred embodiments.

Referring to FIG. 1, a simplified and representative system level diagram depicting a communications system that is operable as a dispatch communications system or system suitable for supporting a dispatch call will be discussed and described. The diagram shows a system 100, including a controller 103 and voice replicator 105 ADP (Audio Duplicating Processor) that are cross-coupled and further coupled to a distribution network 107. The distribution network 107 will include a radio access network (not shown) that supports distribution to one or more cells 109, 111. The distribution network 107 is depicted with 802.11 capacity, via an 802.11 access point (AP) 113, and wire line distribution capability, via the Internet phone 115. Generally the network elements are known with the controller responsible for scheduling communications and resources such as cell sites, traffic channels, and controlling access to the network by various communications units. The ADP duplicates or replicates the audio or traffic from the talker and makes it available to each of the other users involved in the dispatch call. However, as we will discuss various modifications to the controller according to the principles and concepts herein discussed will be required in order to limit a transmission as contemplated.

Note that a plurality of communications units, devices, or subscriber devices, such as cellular handsets, messenger devices, personal digital assistants (PDA), portable computers, and the like, each preferably with voice communications capabilities and with a plurality of associated users, individuals or participants are also depicted. Specifically the diagram depicts the IP phone 115 with user 116, a handset or cellular phone 117 with user 118, a handset 119 with user 120, a handset 121 with user 122, and a handset 123 with 802.11 capability with user 124. User 118 is shown attempting to join the conversation and user 120 is shown making an extended duration statement. These users or individuals via their respective communications units or devices as above discussed are coupled in various generally known manners to the network 107 along with various other entities or resources or users not shown.

The depicted users and associated units or devices can be thought of as a group that is participating in a dispatch call. The group may be defined in various known fashions. Generally the dispatch call is a half duplex call wherein one user is able to (transmit) at any one time with all other users listening (receiving) at that instant in time. This dispatch call is usually set up and managed via the controller 103. A user that wants to talk sends in a request to talk on a control channel. The controller at the proper time issues or grants a right to talk via the control channel. Usually the proper time includes a time after a current talker has released the channel via discontinuing a transmission. Typically the request to talk is initiated via activation of a push to talk button by the user at one of the communications units, a grant or notification thereof will include an audible signal at the user's unit or device and the unit will thereafter be allowed to begin a transmission, and a release of the PTT button will release the traffic channel. The half duplex mode provides certain advantages such as the same channel at cell site 109 can be used for both units 117, 119.

Figure 2:
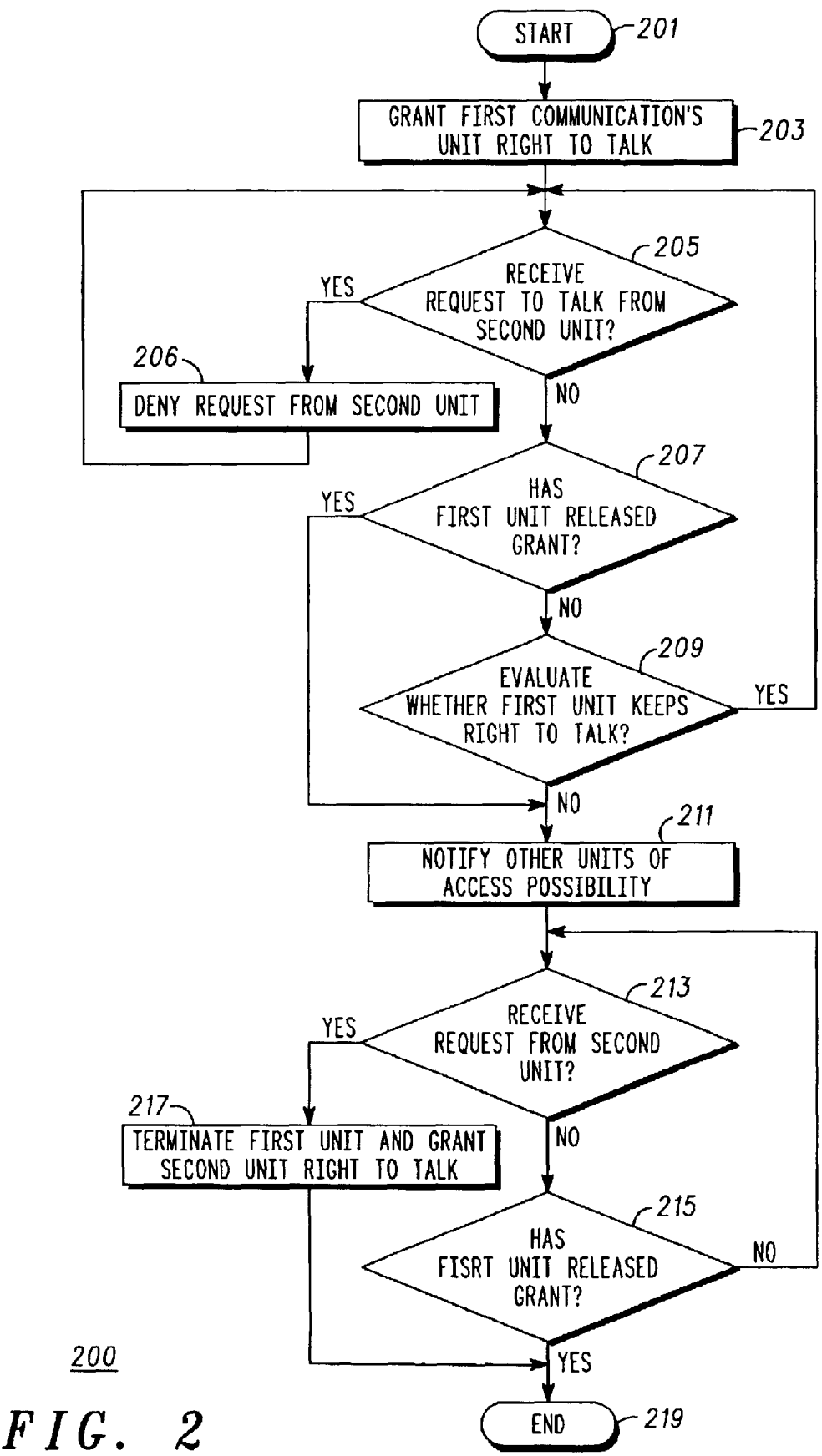
FIG. 2 illustrates a flow chart of a preferred method embodiment of limiting a transmission in the dispatch communications system of FIG. 1.

Referring to FIG. 2, a flow chart of a preferred method embodiment of limiting a transmission in the dispatch communications system of FIG. 1, will be discussed and described. The method 200 is one of limiting a transmission in a dispatch communications system, such as the transmission from user 120 having an extended duration, whether the duration is due to a lack of consideration on the part of user 120 or perhaps due to an equipment malfunction in communications unit 119. The method begins at 201 and at 203 shows granting a first right to talk to a first user or a first communications unit, such as user 120 and unit 119. The normal processes in a dispatch call are depicted at 205, 206, and 207 where a second request to talk is received from another communications unit or user at 205 and denied at 206 so long as the first user has the right to talk. After denial at 206 the process continues to loop back to 205 and when there is no request from another user and in other embodiments regardless of a request, the process moves to 207, where the process tests whether the first unit has released the grant or right to talk. If not 209 depicts evaluating whether the first user should still have or retain or keep the first right to talk. If so, the process loops back to 205 and continues testing as discussed.

If the first user has released the right to talk or grant as determined at 207 or if the evaluation determines that the first user should not keep the right to talk, as further discussed below with reference to FIG. 3, then 211 depicts notifying, when the evaluating so determines, a second user or other users that the first right to talk is no longer applicable. This is an affirmative indication to the other users that they can gain access to the traffic channel if so desired. Note that at this point the first user is allowed to retain the right to talk if the grant has not already been released and as we will see this is true until a second user requests a second right to talk. The process or method at 213 depicts testing whether receiving a request to talk from the second user has occurred and if so at 217 terminating the first right to talk when the evaluating at 209 determines that the first right to talk is no longer applicable; and granting, responsive to the request to talk, a second right to talk to the second user. Note that when a request to talk from a second user has not been received 215 tests whether the first unit has released the channel or the grant of the first right to talk and if not the method loops to 213. If so, or after 217 the method ends. The notifying other users at 211 may further include notifying all other users in the dispatch call or all other users in the dispatch call with a higher priority that the first user, of all other users in the dispatch call that have not been an active talker during the dispatch call, or all other users with specific properties, such as priority and rank and designated length of talk time or users that have specifically reserved time for talking on the dispatch call, or users that have had a request denied while the first user had the right to talk. The notification can occur simultaneously to the proper group or subgroup or it can occur sequentially e.g. in the order of highest to lowest priority or in the order of a denied request to talk. The information, apart from the specific approach that would need to be predetermined or somehow determined in real time such as via a moderator, is available to the controller from its database.

Notifying a user or the techniques used to do so may be accomplished in various ways where the specific approach will likely be system communications unit specific. For example, to notify a user of an IP capable handset, such as units 115 or 123, the controller may send a control command in an IP datagram addressed to the IP address of the handset, while for a cellular handset 117, 119 and 121, the controller may send a control command on the control channel associated with the traffic channel that is being used for the call. Alternatively the controller can notify one or more users by mixing audible information into the audio traffic from the talker after or before it is replicated in the APD 105.

Figure 3:
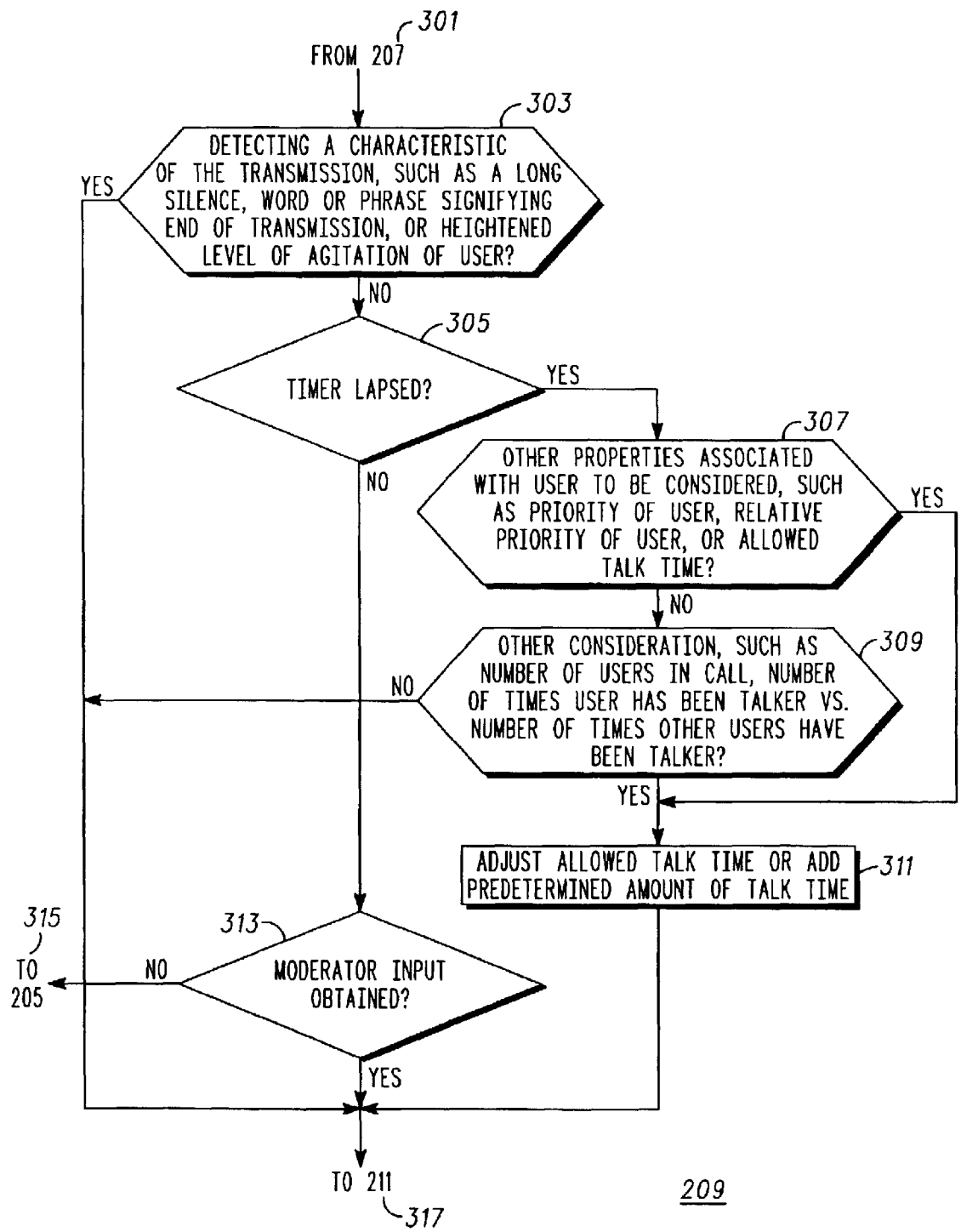
FIG. 3 illustrates a more detailed flow chart of a portion of the FIG. 2 method.

Referring to FIG. 3, a more detailed flow chart of the evaluation portion 209 of the FIG. 2 method will be discussed and described. This method begins at 301 with the "NO" input from 207 and at 303 depicts the evaluating further including detecting a characteristic of the transmission from the first user thereby assuming an intent by the first user to release the first right to talk. The detecting the characteristic of the transmission may includes detecting a long silence in the transmission from the first user suggesting an equipment malfunction due to failure of the equipment or perhaps the equipment has been positioned such that the PTT button remains activated or recognition of a word or phrase signifying the end of the transmission such as "OVER", "OVER and OUT", "COMEBACK" and the like may occur, or a heightened level of agitation by the first user denoted by expletives, rapid speech, or loud speech may be detected. It is expected that one of ordinary skill will be able to think of other tell tale characteristics that would indicate that the transmission should be terminated.

In any event, if no characteristics are detected then 305 tests or determines whether a timer has exceeded a predetermined threshold or lapsed. The value of this timer or threshold may be experimentally determined to provide satisfactory results and may be modified depending on the specifics of a particular dispatch call. For example if the call is one where routine assignments are being handed out to various users a relatively short time would be expected, whereas if the dispatch call is pursuant to comparing many observations from many users a longer timer duration would be expected. At any rate if the timer has lapsed 307 shows the evaluation considering various properties associated with the first user. These properties associated with the first user may include, for example, one or more of a priority of the first user, a relative priority of the first user and the second or other users, or an allowed talk duration of the first user. For example the boss likely has a higher priority than an entry level patrol officer. The user that scheduled the dispatch call may be granted a longer allowed talk time than the other participants and so on.

If none of the properties seem to indicate some special treatment then 309 depicts further considerations. Specifically 309 depicts the evaluating further considering, for example, one or more of a number of other users in a dispatch call, a number of times the first user has been the talker during the dispatch call, and the number of times the other users have been the talker during the dispatch call. For example if there are only two users in the dispatch call a longer transmission from any one user may be appropriate. One the other hand if one user has been the primary talker then it may be beneficial to allow other users to talk. Similarly if a user has not had much to say it may be appropriate to listen to anything they have to say as soon as possible. If other properties associated with the user so indicate at 307 or other considerations from 309 so indicate 311 depicts adjusting the allowed talk time by adding a predetermined amount of time to the timer.

If the timer has not lapsed at 305 the "NO" path is followed to 313 where is obtaining an input from a moderator for a dispatch call is tested. The moderator may be the boss or the one who scheduled the call for example and the input is likely to be in effect "let someone else talk". In the end if no characteristics indicating an end to the transmission have been detected at 303 and the timer has not lapsed at 305 and no moderator input has been received at 313 the first user is allowed to retain the right to talk and the "YES" path 315 is followed to 205. If a characteristic has been detected at 303 or the timer has lapsed 305 with no properties or other considerations indicating a longer talk time 307, 309 or if such properties or considerations suggest an adjustment then after that adjustment at 311 or if the moderator so indicates at 313 the "NO" path 317 is followed to 211 and it is assumed that if another user wishes to talk the first user will be terminated.

The input from the moderator may be obtained in a variety of ways with the particular technique likely depending on who or what form the moderator takes. For example, if the moderator is using an IP capable handset, such as communications units 115, 123, then the moderator can use the user interface of the handset, i.e. by hitting the #key, to generate the input or signal that indicates the talker should be terminated. The handset would then send a control command in an IP datagram addressed to the IP address of the controller. If the moderator uses a cellular handset, such as communications unit 121, the handset, initiated by the moderator via a user interface, may send a control command on the control channel associated with the traffic channel that is being used for the call. Alternatively, the moderator could use a dispatch console station (not shown) that is connected via the network 107 to the controller 103. The user interface of the console would enable to moderator to generate the input used at 313.

Figure 4:
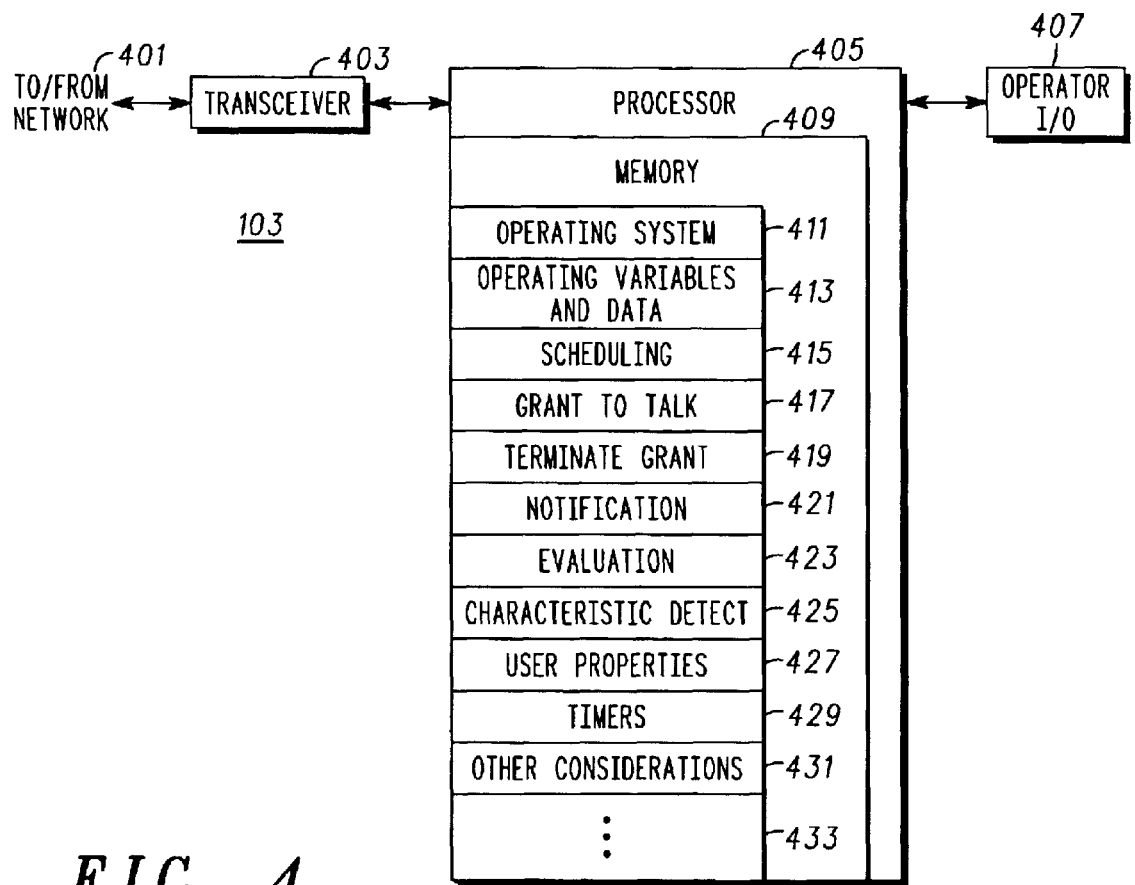
FIG. 4 depicts a block diagram of a preferred embodiment of a controller for limiting a transmission in a dispatch communications system.

Referring to FIG. 4, a block diagram of a preferred embodiment of the controller 103 for limiting a transmission in a dispatch communications system will be discussed and described. The controller 103, as noted above, is for use in a dispatch communications system and is arranged and constructed for limiting a transmission in the dispatch communications system. The controller includes, coupled to and from 401 the network 107, a transceiver 403 that is further inter coupled to a processor 405. The transceiver 403 is preferably a wire line transceiver such as an Ethernet transceiver suitable for packet data communications as well as an audio transceiver. The processor 405 is inter coupled to an operator input output 407, such as a conventional computer monitor and keyboard (not shown). The processor is a conventional reasonably high capacity microprocessor based unit with one or more microprocessors.

The processor 405 includes a memory 409 that includes various software routines and instructions and data that when executed by the processor results in the controller controlling and managing the communications system and implementing a method similar to the one discussed above of limiting a transmission as appropriate in a dispatch call. The memory includes various known RAM, ROM, EEPROM, and magnetic memory elements such as hard drives and the like. The software routines within the memory include an operating system 411, various operating variables, parameters, and date 413, scheduling routines 415, grant a right to talk 417, terminating the grant 419, notification 421, evaluation 423, characteristic detection 425, user including properties and parameters database 427, timing 429, other considerations 431, as well as various other software routines and information 433 not here relevant but obvious to one of ordinary skill.

In operation the processor 405, cooperatively with the transceiver, operates to set up a dispatch call among a group of users or communications units associated with the users and then, responsive to a request to talk, grant and provide or transmit via a control channel a first right to talk to a first user using the grant routine 417 and then to monitor a dispatch call resulting from the grant of the first right to talk to the first user to evaluate whether the first user should retain the first right to talk using the evaluation routine 423; and when appropriate as determined by the evaluation routine, notify other and a second user that the first right to talk is no longer applicable. Notwithstanding the notification the controller or processor will allow the first user to retain the right to talk until a second user requests a second right to talk. The notification will notifies, for example, all other users in the dispatch call, the other users in the dispatch call with a higher priority that the first user, the other users that have not been an active talker during the dispatch call, or the other users with specific properties.

At some point the controller, specifically the processor cooperatively operates with the transceiver to; receives a request to talk from the second user or another user; send a message terminating the first right to talk or grant via routine 419 when an evaluation determines that the first right to talk is no longer applicable; and grant and provide via routine 417, responsive to the request to talk, a second right to talk to the second user. The evaluation that determines the first right to talk should be or is susceptible to being withdrawn or terminated may result from detecting a characteristic via routine 425 of the transmission from the first user and thereby assuming an intent by the first user to release the first right to talk as discussed above. This characteristic may includes one or more of a long silence in the transmission from the first user, a recognition of a word signifying the end of the transmission, or a heightened level of agitation by the first user. The processor and the detection routine 425 would require known speech recognition algorithms in order to do certain of these functions. The evaluation by the controller or processor may also determine whether a timer has exceeded a predetermined threshold via routine 429. Other factors in the evaluation are or may be consideration of properties, via routine 427, associated with the first user, such as one or more of a priority of the first user, a relative priority of the first user and the second user, or allowed talk duration of the first user. Additionally the processor, via routine 431 can consider other issues or considerations in determining whether the first user should retain the first right to talk, such as one or more of a number of other users in a dispatch call, a number of times the first user has been the talker during the dispatch call, or the number of times the other users have been the talker during the dispatch call. Additionally the processor cooperatively with the transceiver may obtain an input from a moderator for a dispatch call that indicates the first user should give up the right to talk or give up the right to talk within a certain amount of time.

Figure 5:
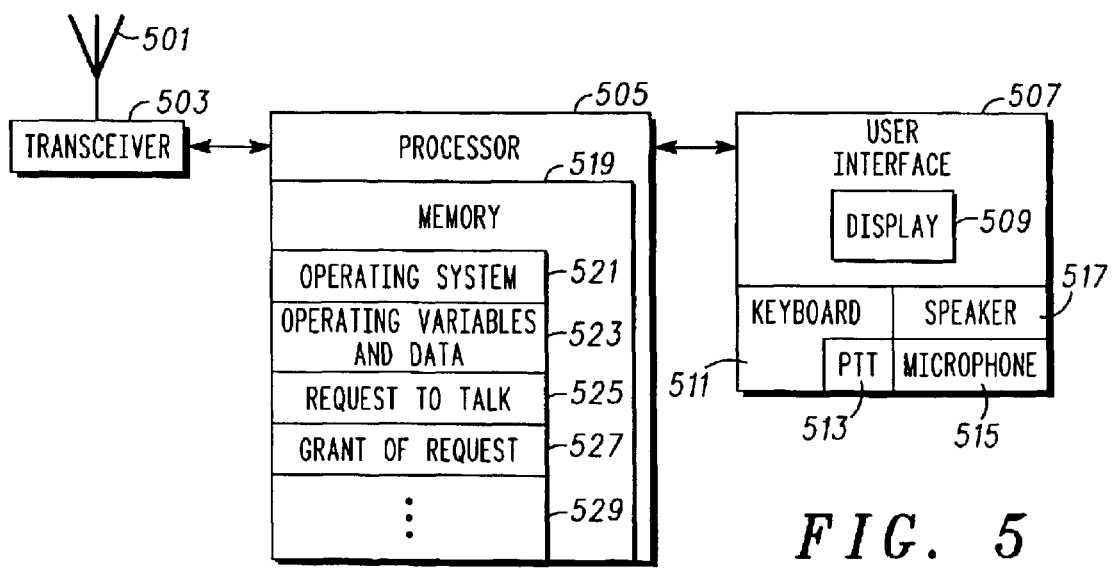
FIG. 5 depicts a block diagram of a preferred embodiment of a communications unit suitable for use in the FIG. 1 system.

Referring to FIG. 5, a block diagram of a communications unit suitable for use in the FIG. 1 system will be described and discussed. The communications unit or device of FIG. 5 is arranged and constructed or operable to or for having a transmission there from limited in a dispatch communications system. The communications unit includes, coupled to an antenna 501 when the unit is a wireless communications unit, a transceiver 503 that is inter coupled to a processor 505. The processor 505 is further coupled to a user interface 507. The transceiver is generally known, whether a wireless (e.g. radio frequency) transceiver or wired transceiver such as an IP wired telephone. The processor 505 is a microprocessor based unit that may include one or more general purpose microprocessors as well as one or more digital signal processors all of which are arranged in a conventional manner. The user interface 507 again is known and includes typically some form of display 509, keyboard or keypad 511 with a push to talk or PTT button 513, as well as audio transducers including a microphone 515 and speaker 517.

The processor further includes a memory 519 comprised of known memory elements such as RAM, ROM, EEPROM or possibly magnetic based memory. The memory includes various software routines or instructions or code that when executed by the processor results in the processor operating as intended in the dispatch communications system. Most of these routines are not specifically shown but would be obvious to one of ordinary skill. Naturally the memory will include an operating system 531, operating variables, parameters, and data 523 a request to talk routine 525, a routine 527 that recognizes a grant of a request to talk, and various other routines not here relevant and too numerous to mention 529.

When the communications unit is the unit that is engaged in an unusually long transmission for the circumstances or situation e.g. the talker from FIG. 1, the unit generally operates as follows. The processor, cooperatively operates with the transceiver, to; send a request to talk, using routine 523, and responsive thereto receives and recognizes a grant of a first right to talk using routine 527. At some point later if the unit has not released the grant or right to talk the communications unit will receive a message from a controller terminating the first right to talk when an evaluation of whether the communications unit should retain the first right to talk is negative.

When the communications unit is one of the units arranged and constructed for participating in a dispatch call or one that does not have the right to talk at some point during a transmission that is excessive from another unit the controller, or specifically processor, will cooperatively operate with the transceiver, to; receive a notice that a request to talk will be granted when an other unit is transmitting; and when so desired, send a request to talk that preempts a preceding grant of a right to talk to the other communications unit when a transmission from the other communications unit is no longer privileged; and then receive a grant of a right to talk. The request to talk will preempts the grant of a right to talk to the other communications unit when, for example, one or more of a priority of the communications unit is higher than a priority of the other communications unit, when the relative frequency of talking of the communications unit is less than the other communications unit, or when a moderator approves a preemption of the right to talk for the other communications unit.

The apparatus, processes, and systems described and discussed above and the inventive principles thereof are intended to and will alleviate problems caused by prior art dispatch call duration limiting techniques that either ignored the call or used a fixed inflexible timing approach ignoring all else to the disadvantage and dismay of users of the systems. Using the above discussed principles and concepts of limiting a transmission only under appropriate circumstances will facilitate dispatch calls that are effective, efficient and friendly thus contributing to user satisfaction and lowering time wasted by large groups of people while a channel is needlessly tied up improperly. It is expected that one of ordinary skill given the above described principles, concepts and examples will be able to implement other alternative procedures that are situation dependent and that will also offer additional quick and efficient call limiting procedures. It is anticipated that the claims below cover such other examples.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of limiting a transmission in a dispatch communications system the method comprising:

granting a first right to talk to a first user, evaluating whether the first user should still have the first right to talk; and notifying, when the evaluating so determines, a second user that the first right to talk is no longer applicable, the notifying providing an affirmative indication to the second user and occurring before detecting that the first user has released the first right to talk and before detecting that the second user has requested a second right to talk.

2. The method of claim 1 further including;

allowing the first user to retain the first right to talk until a second user requests the second tight to talk.

3. The method of claim 2 further including:

receiving a request to talk from the second user;

terminating the first right to talk when the evaluating determines that the first right to talk is no longer applicable; and granting, responsive to the request to talk, the second right to talk to the second user.

4. The method of claim 1 wherein said evaluating further includes detecting a characteristic of the transmission from the first user thereby assuming an intent by the first user to release the first right to talk.

5. The method of claim 4 wherein said detecting said characteristic of the transmission further includes detecting at least one of a long silence in the transmission from the first user, recognition of a word signifying the end of the transmission, and a heightened level of agitation by the first user.

6. The method of claim 1 wherein said evaluating further includes determining whether a timer has exceeded a pre-determined threshold.

7. The method of claim 1 wherein said evaluating considers properties associated with the first user.

8. The method of claim 7 wherein said evaluating further considers the properties associated with the first user including at least one of a priority of the first user, a relative priority of the first user and the second user, and allowed talk duration specific to the first user.

9. The method of claim 1 wherein said evaluating further considers at least one of a number of other users in a dispatch call, a number of times the first user has been the talker during the dispatch call, and the number of times the other users have been the talker during the dispatch call.

10. The method of claim 1 wherein said evaluating further includes obtaining an input from a moderator for a dispatch call.

11. The method of claim 1 wherein said notifying further includes notifying at least one of:

all other users in a dispatch call;

the all other users in the dispatch call with a higher priority than the first user, the all other users in the dispatch call that have not been an active talker during the dispatch call; and the all other users with specific properties.

12. A controller for a dispatch communications system that is arranged and constructed for limiting a transmission in the dispatch communications system the controller comprising:

a transceiver; and a processor, cooperatively operating with the transceiver, to;

grant and provide a first right to talk to a first user;

monitor a dispatch call resulting from the grant of the first right to talk to the first user to evaluate whether the first user should retain the first light to talk; and notify, when the evaluation so determines, a second user that the first right to talk is no longer applicable, the notify further including providing an affirmative indication to the second user and occurring before detecting that the first user has released the first right to talk and before detecting that the second user has requested a second right to talk.

13. The controller of claim 12 wherein the processor further;

allows the first user to retain the right to talk until the second user requests a the second right to talk.

14. The controller of claim 13 wherein the processor cooperatively operates with the transceiver to:

receive a request to talk from the second user;

send a message terminating the first right to talk when an evaluation determines that the first right to talk is no longer applicable; and grant and provide, responsive to the request to talk, the second right to talk to the second user.

15. The controller of claim 12 wherein said processor cooperatively with the transceiver further detects a characteristic of the transmission from the first user and thereby assumes an intent by the first user to release the first right to talk.

16. The controller of claim 15 wherein said characteristic includes at least one of a long silence in the transmission from the first user, a recognition of a word signifying the end of the transmission, and a heightened level of agitation by the first user.

17. The controller of claim 12 wherein said processor further determines whether a timer has exceeded a predetermined threshold.

18. The controller of claim 12 wherein said processor considers properties associated with the first user.

19. The controller of claim 18 wherein said processor further considers the properties associated with the first user including at least one of a priority of the first user, a relative priority of the first user and the second user, and allowed talk duration specific to the first user.

20. The controller of claim 12 wherein said processor in order to evaluate whether the first user should retain the first right to talk, further considers at least one of a number of other users in a dispatch call, a number of times the first user has been the talker during the dispatch call, and the number of times the other users have beau the talker during the dispatch call.

21. The controller of claim 12 wherein said processor cooperatively with the transceiver further obtains an input from a moderator for a dispatch call.

22. The controller of claim 12 wherein said processor cooperatively with the transceiver further notifier at least one of; all other users in a dispatch call, the all other users in the dispatch call with a higher priority that the first user, the all other users that have not been an active talker during the dispatch call, and the all other users with specific properties.

23. A communications unit arranged and constructed for participating in a dispatch call with a limited transmission in a dispatch communications system, the communications unit comprising:

a transceiver; and a processor, cooperatively operating with the transceiver, to;

receive a notice that a request to talk will be granted when an other unit is transmitting, the other unit participating in the dispatch call;

send a request to talk that preempts a grant of a right to talk to the other communications unit when a transmission from the other communications unit is no longer privileged; and receive a grant to talk.

24. The communications unit of claim 23 wherein the request to talk preempts the grant of a right to talk to the other communications unit when at least one of: a priority of the communications unit is higher than a priority of the other communications unit, when the relative frequency of talking of the communications unit is less than the other communications unit, and when a moderator approves a preemption of the right to talk for the other communications unit.

25. The communication unit of claim 23 wherein the processor upon receipt of the notice provides an audible signal corresponding to the notice.

* * * * *